INVENTORS
GEORGE M. THOMSON
ROBERT H. BOSWORTH

June 6, 1967 G. M. THOMSON ETAL 3,323,376
FLEXIBLE PIVOT GAS FLOW RESTRICTION SEAL DEVICE
Filed May 23, 1963 3 Sheets-Sheet 2

INVENTORS
GEORGE M. THOMSON
ROBERT H. BOSWORTH
BY *Herbert L. Davis*
ATTORNEY

June 6, 1967  G. M. THOMSON ETAL  3,323,376
FLEXIBLE PIVOT GAS FLOW RESTRICTION SEAL DEVICE
Filed May 23, 1963  3 Sheets-Sheet 3

INVENTORS
GEORGE M. THOMSON
ROBERT H. BOSWORTH
BY Herbert L. Davis
ATTORNEY united States Patent Office 3,323,376
Patented June 6, 1967

3,323,376
FLEXIBLE PIVOT GAS FLOW RESTRICTION
SEAL DEVICE
George M. Thomson, Wayne, and Robert H. Bosworth, Morristown, N.J., assignors to The Bendix Corporation, Teterboro, N.J., a corporation of Delaware
Filed May 23, 1963, Ser. No. 282,793
5 Claims. (Cl. 74—5.4)

This invention relates to a flexible pivot gas flow restriction seal device and more particularly to a frictionless, spring rotating, rotary seal device which may restrict gas flow from a hot gas rate gyroscope of a type disclosed and claimed in U.S. application Ser. No. 189,144, filed Apr. 20, 1962, now Patent Number 3,254,538, by George M. Thomson and James S. Malcolm, and assigned to The Bendix Corporation.

The rotary gas flow restriction seal device is arranged in cooperative relation with a flexural pivot device of a type such as disclosed and claimed in a U.S. Patent No. 3,073,584 which was granted on Jan. 15, 1963, to Henry Troeger, and assigned to The Bendix Corporation.

An object of the invention is to provide an improved flexural pivot gas flow restriction seal device embodying a flexural pivot device which is of a simple construction including a pair of flat crossed springs supporting two arcuate inner elements angularly movable in a pair of axially spaced tubular members, to each of the tubular members there is affixed a collar having a circular plate projecting therefrom, the two circular plates are positioned in spaced relation so as to form a seal arrangement permitting restricted gas flow between opposed faces of the circular plates to a space provided between opposed ends of the axially spaced tubular members, along the arcuate inner elements and axially within the tubular members to the exterior atmosphere.

Another object of the invention is to provide a flexural pivot device including circular seal plates spaced apart so as to permit a controlled escape flow of a gaseous pressure medium through the space between the seal faces and through the flexural pivot carrying the seal plates and therethrough to the exterior atmosphere.

Another object of the invention is to provide a novel flexural pivot gas flow restriction seal device for use in maintaining a sealed casing under a gaseous pressure in which may be operated a gyroscope and bleeding the gaseous pressure medium from the casing into a housing of a rotor of the gyroscope to drive the rotor and then exhausting the pressure medium from the rotor housing through the flexural pivot device to atmosphere as well as providing a leakage path for the gaseous pressure medium from the sealed casing through restricted seal faces leading into the flexural pivot device and therethrough to the atmosphere.

Another object of the invention is to provide in the aforenoted arrangement means for effecting a restricted leakage flow of the gaseous pressure medium by a close spacing of the seal faces of two circular plates forming the seal arrangement in cooperation with the flexural pivot device so as to provide a frictionless, spring restrained, rotary seal device for the gyroscope casing and rotor housing while providing a desired leakage and passage of the gaseous fluid pressure medium from within the gyroscope casing and rotor housing.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

In the drawings:

FIGURE 1 is a longitudinal cross sectional assembly view of a device embodying the invention and showing a flexural pivot supporting a pair of circular seal plates arranged in spaced relation so as to permit a controlled restricted escape flow of a gaseous pressure medium through the space between opposed faces of the two circular plates into the flexural pivot and axially therethrough to the exterior atmosphere.

Figure 1:
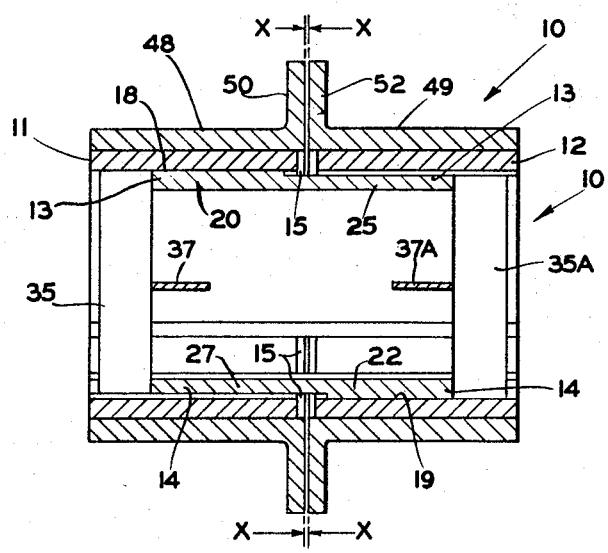
Figure 2:
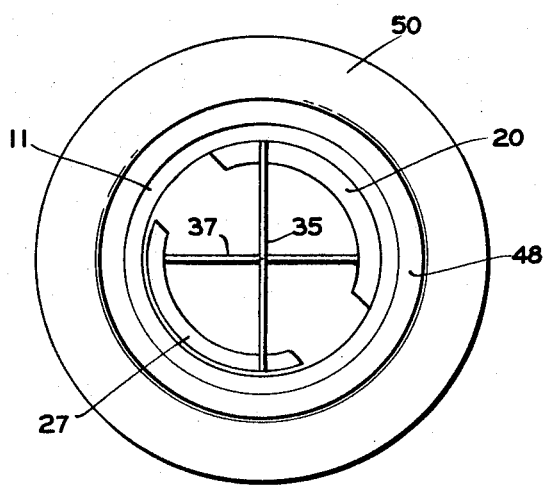
FIGURE 2 is an end view of FIGURE 1.

Referring to the drawing of FIGURE 1, it can be seen that an assembly of the flexural pivot gas flow restriction seal device 10 may comprise a pair of axially aligned tubular members 11 and 12 and two angularly movable arcuate inner elements 13 and 14 which may be formed as described and claimed in the aforesaid U.S. Patent No. 3,073,584, granted on January 15, 1963, to Henry Troeger, and assigned to The Bendix Corporation.

The axially aligned tubular members 11 and 12 are spaced at 15 between the opposed ends thereof. The left tubular member 11 is bonded to mounting surface 18 of the upper arcuate element 13 while the right tubular member 12 is bonded to the mounting surface 19 of the lower arcuate element 14. The effective angle included between the adjacent edges of the arcuate elements 13 and 14 is thirty degrees (30°). This angle can have a range of fifteen to forty-five degrees. The adjacent axially-extending edges of elements 13 and 14 provide stop means to limit angular movement of the elements 13 and 14 relative one to the other.

It will be noted that arcuate elements 13 and 14 include mounted surface sections 20 and 22 and axially extending reduced diameter sections 25 and 27 which project into right and left tubular members 12 and 11, respectively, and are spaced therefrom. Cross springs 35 and 37 are firmly bonded at opposite ends thereof in the sections 20 and 27 of the arcuate elements 13 and 14 while cross springs 35A and 37A are firmly bonded at opposite ends thereof in the sections 22 and 25 of the arcuate elements 13 and 14. Thus the cross springs 35 and 37 and 35A and 37A are so arranged that resilient connections are maintained between the tubular members 11 and 12 under adverse flexing conditions and further so that relative axial movement or tilting between the left and right tubular members 11 and 12 is prevented.

Crossed springs 35 and 37 and 35A and 37A at opposite ends of the flexural pivot device 10 provide a rotational axis adjacent to the intersection of the springs. The two identical constructions provided by tubular member 11 with arcuate member 13 and tubular member 12 with arcuate member 14 can be referred to as two cylindrical means having inwardly-projecting arcuate structures which have finger-like means extending axially.

For the left cylindrical means (member 11 and element 13) the arcuate structure consists of mounting surface section 20 and reduced diameter section 25 which forms a fingerlike means extending axially into and radially spaced from the right cylindrical means (member 12 and element 14). For the right cylindrical means, the arcuate structure is formed by mounting surface section 22 and the reduced diameter section 27 which forms a fingerlike means extending axially into and radially-spaced from the left cylindrical means. With this terminology, the facing parts of arcuate structures are connected by cross springs 35 and 37 and cross springs 35A and 37A whereby relative rotation between the two cylindrical means can be effected. The arcuate structures limit this rotation. The fingerlike sections 25 and 27 are spaced radially sufficient so that contact is prevented during relative rotation of the members 11 and 12 as the cross springs 35 and 37 and 35A and 37A are flexed. Further, welded to the tubular member 11 and to the tubular member 12 are collars 48 and 49 having radially projecting therefrom circular seal plates 50 and 52 spaced apart by a dimension X so as to permit a restricted leakage flow of a gaseous medium under pressure from within the gyroscope casing as indicated by arrows in FIGURE 3.

The escape leakage flow is controlled by adjusting the dimension X which is the spacing between the seal faces of the plates 50 and 52 prior to welding the collars 48 and 49 carrying the circular plates 50 and 52 to the outer tubular members 11 and 12 of the flexural pivot device. The dimension X may be determined by a shim of, for example, .00025 of an inch thick positioned between the faces of the circular plates 50 and 52 and welding the plates into position, and thereafter removing the shim.

With the faces of circular seal plates 50 and 52 separated by the critical distance .00025 of an inch, there may be permitted a controlled escape flow of the gaseous pressure medium from within the gyro casing through the restricted passage provided between opposite faces of the plates 50 and 52 into the space 15 between the opposed ends of the tubular members 11 and 12 and thereby into an axial passage provided by the tubular members 11 and 12 to the atmosphere. Further fluid pressure medium may be exhausted from the interior of the housing of the rotor of the gyroscope axially through the tubular members 11 and 12 to the exterior atmosphere.

Figure 3:
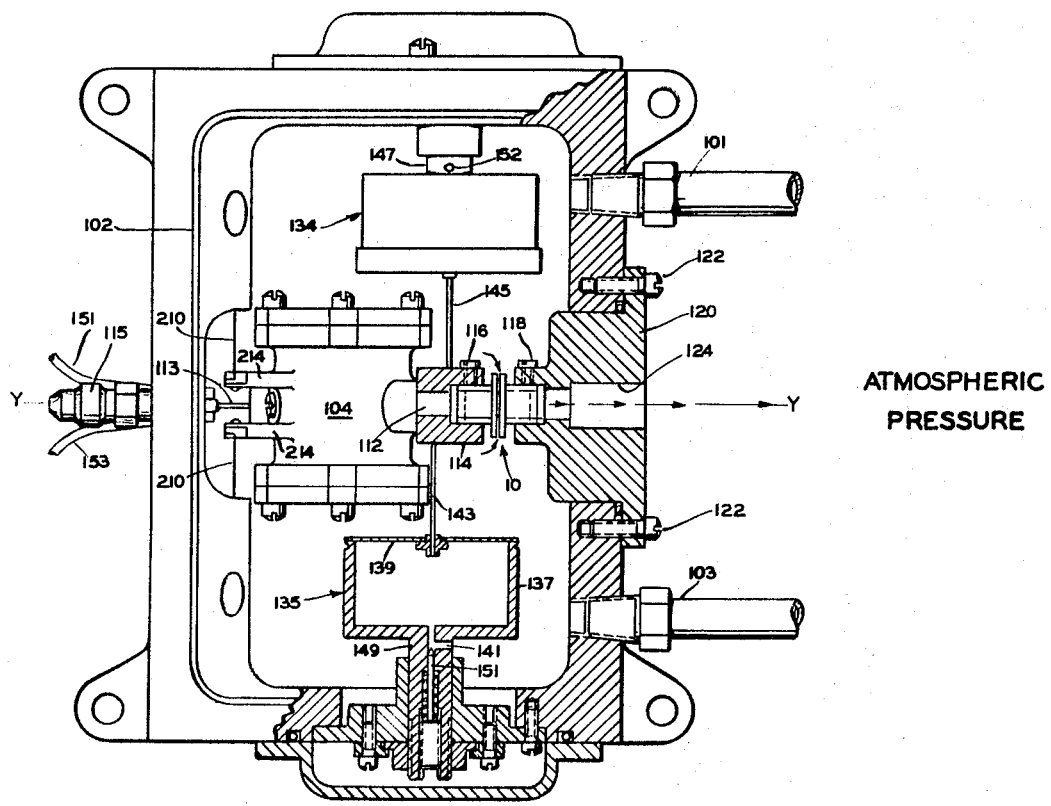
FIGURE 3 is a view of a novel flexural pivot and gas flow restriction seal assembly embodied in a gyroscopic device of a type disclosed and claimed in the aforenoted Thomson et al. U.S. application Serial No. 189,144, filed Apr. 20, 1962.

The operation of the hot gas gyroscope of FIGURE 3, as described in the aforenoted Thomson et al. U.S. application Ser. No. 189,144, may depend upon maintaining a gaseous medium under pressure within the casing of the gyroscope and bleeding gas into the rotor housing to drive the rotor of the gyroscope and pressurize the bearings thereof.

Figure 4:
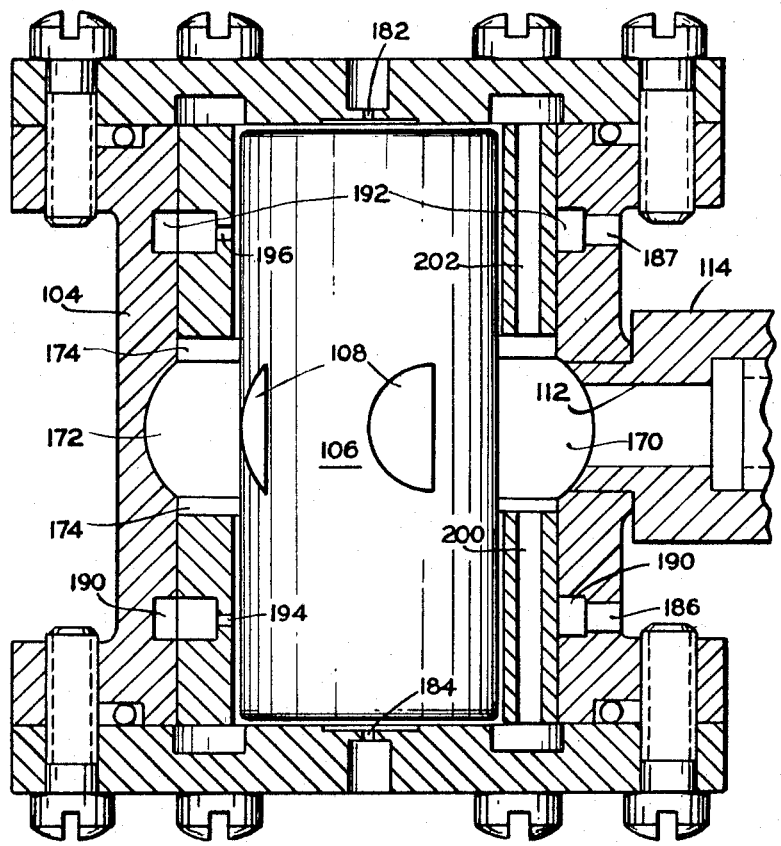
FIGURE 4 is an enlarged section of the rotor housing of FIGURE 3 illustrating the arrangement of the turbine therein and an exhaust passage therefrom through the flexural pivot seal device.

In the rate gyroscope of FIGURE 3, there may be provided a sealed casing 102 and pivotally mounted in the sealed casing 102 a rotor housing 104. Further, as shown in FIGURE 4, and explained in detail in the aforenoted Thomson et al. U.S. application Ser. No. 189,144, there is provided in the housing 104 a gas pressure driven rotor turbine 106 having buckets 108 and rotatably mounted on gas bearings. The rotor housing 104 has suitable inlet passages for bleeding into the housing 104 jets of gaseous pressure medium impinging on the buckets 108 of the rotor turbine 106 for driving the rotor 106. There is further provided an outlet passage 112 for exhausting the gaseous pressure medium from within the rotor housing 104.

A gaseous medium under pressure is supplied through a hollow torsion tube 113 which opens into the casing 102 through a jet pipe gaseous pressure supply nozzle cooperatively arranged relative to two (2) jet pipe receiver orifices for providing suitable fluid pressure signals, as explained in the aforenoted Thomson et al. U.S. application Serial No. 189,144. Further, the gaseous medium may be accumulated under pressure in the sealed casing 102 and directed into the rotor housing 104 so as to rotate the gyroscope rotor or turbine 106 and provide the gas bearings on which the rotor 106 is suspended.

The rotation of the gyroscope rotor 106 effects an angular momentum about the spin axis of the gyroscope rotor 106 which, in turn, creates a gyroscopic torque about an output axis Y—Y when an angular velocity is applied about the input axis. This torque produces gimbal motion about the output axis Y—Y which is restrained by the torsion tube 113 and the flexural pivot gas flow restriction seal device 10 and is sensed by the adjusted position of the aforenoted jet pipe nozzle relative to the receiver orifices previously described. The hollow torsion tube may be connected to a suitable supply line for a gaseous pressure medium through a connection 115, as explained in the aforenoted Thomson et al. U.S. application Ser. No. 189,144.

The outlet passage 112 may extend through a flange 114 affixed at one end to the rotor housing 104. The opposite end of the flange 114 is secured by a suitable fastening bolt 116 to the collar 48 of the flexural pivot gas flow restriction seal device 10. The collar 49 at the opposite end of the pivotal device 10 is secured by a suitable fastening bolt 118 to a supporting member 120 which is secured by suitable bolts 122 in the wall of the sealed casing 102.

As shown then in FIGURES 3 and 4, the outlet passage 112 permits the pressurized gaseous medium to exhaust from the interior of the rotor housing 104 into the axial passage provided in the tubular members 11 and 12 of the flexural pivot seal device 10 and thereby into a passage 124 provided in the supporting member 120 to the exterior atmosphere, as indicated by the arrows in the drawing of FIGURE 3.

Furthermore, the radially projecting circular seal plates 50 and 52 are so closely spaced apart as to permit a restricted leakage flow of gaseous medium under pressure from within the interior of the gyroscope casing 102 into the space 15 between the opposed ends of the tubular members 11 and 12 and thereby into the interior of the tubular members 11 and 12 so that such gaseous pressure medium in turn flows axially therethrough into the channel 124 and out to the exterior atmosphere, as indicated by the arrows in FIGURE 3.

Thus the circular seal plates 50 and 52 permit the pressurized pressure medium within the interior of the casing 102 to leak through the restricted passage provided between the opposed faces of the plates 50 and 52 so as to in turn be exhausted to the atmosphere through the channel 124 together with the exhaustion of the fluid pressure medium from within the rotor housing 104 which is effected through the passage 112, tubular members 11 and 12 and the channel 124.

As explained in the aforenoted U.S. application Ser. No. 189,144, the angle of motion of the rotor housing 104 about the axis Y—Y of the tube 113 and the flexural pivot seal device 10 effects an angular adjustment of the aforenoted jet pipe gaseous pressure supply nozzle relative to two (2) jet pipe receiver orifices opening from opposite face surfaces of a suitable control block positioned in spaced relation to the nozzle. The jet pipe nozzle and receiver orifice may be of a conventional type, as shown, for example, by U.S. Patent No. 2,345,169 granted Mar. 28, 1944, to G. Wunsch et al. and may be operably connected to suitable output signal conduits 151 and 153, shown diagrammatically and explained in the aforenoted U.S. application Ser. No. 189,144.

The oscillatory motion of the rotor housing 104 about the axis Y—Y of torsion tube 113 and the flexural pivot gas flow restriction seal device 10 is damped by two (2) opposing diaphragm assemblies 134 and 135 of identical construction, as shown and explained in the aforenoted U.S. application Ser. No. 189,144.

The diaphragm assembly 135, as shown in detail in FIGURE 3, may include a cup shaped member having an end thereof sealed to a flexible diaphragm 139 while the interior of the cup shaped member opens through a restricted passage 141 to the pressurized gaseous medium within the sealed case 102. The flexible diaphragm 139 is operatively connected to a flexible rod 143 through the flange 114 affixed to the rotor housing 104. The diaphragm assembly 134 is similarly constructed and is operatively connected through a flexible rod 145 to the flange 114 at the opposite side thereof.

The cup shaped member of the diaphragm assembly 134 is connected by a post 147 to the interior surface of the casing 102 while the cup shaped member 137 of the diaphragm assembly 135 is similarly connected by a post 149 to the interior surface of the casing at the opposite side of the flange 114 from the diaphragm assembly 134. The passage 141, as shown in FIGURE 3, is restricted by an adjustable pin 151 projecting through the post 147 and screw threadably engaged therein. The diaphragm assembly 134 has a similar adjustable pin for restricting a passage 152 in the post 147 connecting the interior of the cup shaped member of the diaphragm assembly 134 to the gaseous pressure medium within the sealed casing 102.

Undesirable oscillatory movements of the rotor housing 104 are damped by the action of the two (2) opposed diaphragm assemblies 134 and 135 acting between the flange 114 and the casing 102. This is accomplished by one of the diaphragms of the diaphragm assemblies 134 and 135, for example, diaphragm 139 pressing the volume of the gaseous medium in the interior of the cup shaped member 137 and exhaling it through the restricted passage 141 into the interior of the pressurized casing 102 while the diaphragm of the other assembly 134, for example, expands the volume of gas within the interior of the cup shaped member thereof and inhales additional fluid pressure medium through the restricted passage 152. Each of the diaphragms of the diaphragm assemblies 134 and 135 may alternately expand and compress the gaseous medium in the interior thereof in one complete cycle of operation to effectively damp undesirable oscillary motions of the gimbal or rotor housing 104.

Further, as explained in the aforenoted Thomson et al. U.S. application Ser. No. 189,144, pressurized gaseous medium from within the housing 102 is directed through suitable passages in the rotor housing 104 in impinging relation to the buckets 108 so as to serve to drive the turbine 106 within the rotor housing 104. The jets of pressurized impinging gaseous medium are in turn exhausted, as shown in FIGURE 4, into the cavities 170 and 172 within the rotor housing 104 at opposite sides of the turbine 106. The cavities 170 and 172 are in fact connected through annular passages 174 in the rotor housing 104 so that the pressurized gaseous medium exhausted into the interconnected cavities 170 and 172 may in turn be exhausted through the exhaust passage 112 provided in flange 114 and through the flexural pivot seal device 10 and thereby to the atmosphere through the exhaust channel 124 in the casing 102, as shown by arrows in FIGURE 3.

There is further provided in the rotor housing 104 at opposite ends thereof, as shown in FIGURE 4, inlet passages 182 and 184 through which the gaseous pressure medium within the sealed casing 102 may be directed into the interior of the housing 104 to provide gas bearings for floating the rotor or turbine 106 in the housing 104.

Further, opening through the side of the housing 104 are ports 186 and 187 which serve to direct pressurized gaseous medium from within the casing 102 into annular channels 190 and 192 which in turn open through ports 194 and 196 into the interior of the rotor housing 104 so as to apply a layer of pressurized gaseous medium about the bearing surfaces of the turbine 106. Such gaseous medium under pressure is applied both to turbine 106 at the bearing end surfaces thereof as well as to the annular side bearing surfaces of the turbine 106.

The turbine 106 is effectively floated then in a gas bearing within the rotor housing 104 provided by the pressurized gaseous medium applied through the ports 182, 184, 186, and 187. The pressurized gaseous medium forming the gas bearings at the ends of the turbine 106 are further exhausted through passages 200 and 202 into the annular channels 174 heretofore described.

Likewise the gaseous medium forming the gas bearing about the annular bearing surfaces of the turbine 106 exhausts into the channels 174 which in turn interconnect the cavities 170 and 172 and thereby exhaust through the passage 112 and exhaust passage 124 to the atmosphere, as heretofore explained.

Thus through the provision of the novel flexural pivot seal device 10, gas flows through the pivot device 10 from the rotor housing 104 to atmosphere and from the interior of the casing 102 through the restricted passage provided between the opposite faces of the plates 50 and 52 to atmosphere. Minimum leakage flow is obtained by a close spacing of the seal faces of the plates 50 and 52. Thus, the device 10 allows frictionless, rotary motion about axis Y—Y, of FIGURE 3, with small loss of the supply gas.

The flexural pivot seal 10 provides a frictionless seal which may be used in pneumatic or hydraulic devices where rotary motion between two parts occurs. It also provides means for effecting an adjustable, controlled leakage rate.

Although only one embodiment of the invention has been illustrated and described, various changes in the form and relative arrangement of the parts which will now appear to those skilled in the art may be made without departing from the scope of the invention. Reference is, therefore, to be had to the appended claims for a definition of the limits of the invention.

What is claimed is:

1. In a device of a type including first and second arcuate inner sleeve elements arranged on a common circle, first and second outer tubular sleeve means being arranged in axial alignment around said arcuate inner sleeve elements, said first and second outer tubular sleeve means having opposed ends arranged in spaced relation, said first arcuate inner sleeve element and said first outer tubular sleeve means being bonded together, said second arcuate inner sleeve element and said second outer tubular sleeve means being bonded together, said first arcuate inner sleeve element being radially spaced from said second outer tubular means, said second arcuate inner sleeve element being radially spaced from said first outer tubular sleeve means, first spring means resiliently connecting said first outer tubular sleeve means to said second arcuate inner sleeve element, and second spring means resiliently connecting said second outer tubular sleeve means to said first arcuate inner sleeve element; the improvement comprising a pair of circular plates, one of said plates being affixed to said first outer tubular sleeve means, and the other of said plates being affixed to said second outer tubular sleeve means, and said plates having opposed faces arranged in close spaced relation so as to permit a restricted flow of fluid pressure medium between opposed faces thereof into the space between the opposed ends of the first and second outer tubular sleeve means and axially through at least one of said outer tubular sleeve means.

2. In a gaseous pressure operated rate gyroscope of a type including a first casing, a second casing, means for supporting the second casing for angular adjustment within the first casing, means for supplying a pressurized gaseous medium to the interior of the first casing, a turbine member mounted within said second casing, means for directing a pressurized gaseous medium from within said first casing into said second casing for rotatably driving said turbine member, and flexible tubular means for exhausting pressurized gaseous medium therethrough from within said second casing and exteriorly of said first casing, and said flexible tubular means including restrictive means for exhausting pressurized gaseous medium into said flexible tubular means from within said first casing and through said flexible tubular means exteriorly of said first casing.

3. The combination defined by claim 2 in which said flexible tubular means includes a flexural pivot gas flow restriction seal device to support the second casing for angular adjustment relative to the first casing, said flexural pivot device permitting exhaustion therethrough of pressurized gaseous medium from within said second casing, and said flexural pivot device including means for permitting a restrictive flow of pressurized gaseous medium from within the interior of the first casing into said flexural pivot device and therethrough exteriorly of said first casing.

4. In a device of a type including the first and second arcuate inner sleeve elements arranged on a common circle, first and second outer tubular sleeve means arranged in axial alignment around said inner sleeve elements and having opposed ends arranged in spaced relation, said first arcuate inner sleeve element and said first outer tubular sleeve means being bonded together, said second arcuate inner sleeve element and said second outer tubular sleeve means being bonded together, said first arcuate inner sleeve element being radially spaced from said second outer tubular sleeve means, said second arcuate inner sleeve element being radially spaced from said first outer tubular sleeve means, first spring means resiliently connecting said first outer tubular sleeve means to said second arcuate inner sleeve element, and second spring means resiliently connecting said second outer tubular sleeve means to said first arcuate inner sleeve element; the improvement comprising restrictive means for exhausting fluid pressure medium therethrough into the space between the opposed ends of the first and second outer tubular sleeve means and axially through at least one of said outer tubular sleeve means.

5. In a gaseous pressure operated rate gyroscope of a type including a first casing, a second casing, means for supporting the second casing for angular adjustment within the first casing, means for supplying a pressurized gaseous medium to the interior of the first casing, a turbine member mounted within said second casing, means for directing a pressurized gaseous medium from within said first casing into said second casing for rotatably driving said turbine member; the improvement comprising a flexural pivot device including a pair of axially aligned tubular members having opposed ends arranged in spaced relation, one of said tubular members being connected to the first casing and the other of said tubular members being connected to the second casing, a pair of axially aligned arcuate inner sleeve members arranged within said tubular members, spring means for flexurally connecting one sleeve member to the other sleeve member, so as to permit the angular adjustment of the second casing within the first casing, a pair of plates, one of said plates being affixed to one of said tubular members and the other of said plates being affixed to the other of said tubular members, and said plates being arranged in spaced relation so as to permit a leakage flow of gaseous medium under pressure from within the first casing into the interior of the tubular members, and the tubular members providing through the interior thereof an axial exhaust passage from the interior of the second casing through the first casing to atmosphere.

References Cited

UNITED STATES PATENTS 2,078,734    4/1937    Schilovsky    74—5.7 X
3,073,584    1/1963    Troeger    308—2 X FRED C. MATTERN, Jr., *Primary Examiner.*

BROUGHTON G. DURHAM, MILTON KAUFMAN,
*Examiners.*

T. W. SHEAR, *Assistant Examiner.*